US008681672B2

(12) United States Patent
Park

(10) Patent No.: US 8,681,672 B2
(45) Date of Patent: Mar. 25, 2014

(54) METHOD FOR TRANSITIONING RADIO RESOURCE CONTROL STATE OF USER EQUIPMENT TO IDLE STATE, SYSTEM THEREFOR, AND THE SAME USER EQUIPMENT

(75) Inventor: Jong-Man Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1070 days.

(21) Appl. No.: 12/082,398

(22) Filed: Apr. 10, 2008

(65) Prior Publication Data

US 2008/0253312 A1 Oct. 16, 2008

(30) Foreign Application Priority Data

Apr. 13, 2007 (KR) .................................. 2007-36670

(51) Int. Cl.
*G08C 17/00* (2006.01)
*H04W 4/00* (2009.01)

(52) U.S. Cl.
USPC .......................................... 370/311; 370/331

(58) Field of Classification Search
USPC ........................................................ 370/311
See application file for complete search history.

(56) References Cited

U.S. PATENT DOCUMENTS

| 5,909,471 | A | * | 6/1999 | Yun ................................ 375/343 |
| 6,377,790 | B1 | | 4/2002 | Ishii |
| 6,820,049 | B1 | * | 11/2004 | Monroe et al. .................... 703/21 |
| 6,917,817 | B1 | * | 7/2005 | Farrow et al. ................... 455/557 |
| 7,054,268 | B1 | | 5/2006 | Parantainen et al. |
| 7,054,630 | B2 | * | 5/2006 | Nagpal et al. .................... 455/434 |
| 7,394,765 | B2 | * | 7/2008 | Yi et al. ........................... 370/235 |
| 7,539,160 | B2 | * | 5/2009 | Virtanen et al. ................. 370/329 |
| 7,555,663 | B2 | | 6/2009 | Krantz et al. |
| 7,577,431 | B2 | * | 8/2009 | Jiang ............................ 455/432.1 |
| 2005/0064872 | A1 | * | 3/2005 | Osseiran et al. .............. 455/452.1 |
| 2005/0163074 | A1 | * | 7/2005 | Mella et al. ....................... 370/329 |
| 2005/0169205 | A1 | * | 8/2005 | Grilli et al. ....................... 370/313 |

(Continued)

FOREIGN PATENT DOCUMENTS

| CN | 1568046 A | 1/2005 |
| CN | 1734976 A | 2/2006 |

(Continued)

OTHER PUBLICATIONS

European Search Report dated Aug. 27, 2008 in connection with European Patent Application No. 08 15 3796.

(Continued)

*Primary Examiner* — Gerald Smarth

(57) ABSTRACT

In a WCDMA mobile communication system, when the amount of packet traffic transmitted to or received from a UE decreases during a predetermined time in a CELL_DCH state in which a WCDMA packet data connection has been established, the UE transitions to a CELL_FACH state by a radio network controller (RNC). Thereafter, it is determined if there is no transmitted or received packet traffic during a certain time in the CELL_FACH state (which is an RRC state in which an RRC connection has been connected, and the dedicated physical channel has been released). When it is determined that there is no transmitted or received packet traffic during the certain time, the UE requests a network to release the RRC connection by utilizing a Signaling Connection Release Indication (SCRI) message. The invention enables a UE to check a packet transmission or reception flow, and to directly transmit the SCRI message to the network.

18 Claims, 7 Drawing Sheets

(56) References Cited

U.S. PATENT DOCUMENTS

| | | | |
|---|---|---|---|
| 2006/0106865 A1* | 5/2006 | Beming et al. | 707/104.1 |
| 2006/0146760 A1* | 7/2006 | Khandekar et al. | 370/335 |
| 2006/0222009 A1* | 10/2006 | Yao et al. | 370/469 |
| 2006/0286991 A1* | 12/2006 | Palacio et al. | 455/500 |
| 2007/0049277 A1* | 3/2007 | Nakamata et al. | 455/436 |
| 2007/0058595 A1* | 3/2007 | Classon et al. | 370/337 |
| 2007/0183380 A1* | 8/2007 | Rensburg et al. | 370/338 |
| 2008/0032630 A1* | 2/2008 | Kim et al. | 455/45 |
| 2008/0043865 A1* | 2/2008 | Kim et al. | 375/260 |
| 2008/0049662 A1* | 2/2008 | Islam et al. | 370/328 |
| 2008/0076419 A1* | 3/2008 | Khetawat et al. | 455/435.1 |
| 2008/0159218 A1* | 7/2008 | Dwarakanath | 370/329 |
| 2008/0170533 A1* | 7/2008 | Cyzs et al. | 370/315 |
| 2009/0097441 A1* | 4/2009 | Lee et al. | 370/328 |
| 2009/0201879 A1* | 8/2009 | Purkayastha et al. | 370/331 |
| 2009/0257378 A1* | 10/2009 | Cuny et al. | 370/328 |
| 2011/0007682 A1* | 1/2011 | Islam et al. | 370/311 |
| 2011/0122971 A1* | 5/2011 | Kim et al. | 375/316 |

FOREIGN PATENT DOCUMENTS

| | | |
|---|---|---|
| CN | 1736124 A | 2/2006 |
| CN | 1866957 A | 11/2006 |
| EP | 1 798 998 A1 | 6/2007 |
| KR | 20020073516 A | 9/2002 |
| KR | 20040070096 A | 8/2004 |

OTHER PUBLICATIONS

"Universal Mobile Telecommunications System (UMTS); UTRAN Iu interface Radio Access Network Application Part (RANAP) signalling (3GPP TS 25.413 version 6.13.0 Release 6)", Mar. 2007, 332 pages.

"Universal Mobile Telecommunications System (UMTS); Radio Resource Control (RRC); Protocol specification (3 GPP TS 25.331 version 6.13.0 Release 6)", Mar. 2007, 1248 pages.

"UE "Fast Dormancy" Behaviour", 3GPP TSG-RAN WG2 Meeting #60, Vodafone, RIM, Huawei, Jeju, South Korea, 5th-9th Nov. 2007, 4 pages.

Office Action dated Jan. 29, 2010 in connection with Chinese Patent Application No. 200810131452.8.

Office Action dated Sep. 9, 2010 in connection with Chinese Application No. 200810131452.8.

Korean Office Action dated Aug. 26, 2013 in connection with Korean Application No. KR 10-2007-0036670; 7 pages.

* cited by examiner

US 8,681,672 B2

METHOD FOR TRANSITIONING RADIO RESOURCE CONTROL STATE OF USER EQUIPMENT TO IDLE STATE, SYSTEM THEREFOR, AND THE SAME USER EQUIPMENT

CROSS-REFERENCE TO RELATED APPLICATION(S) AND CLAIM OF PRIORITY

The present application claims priority to application entitled "Method For Transitioning Radio Resource Control State Of User Equipment To Idle State, System Therefor, And The Same User Equipment" Filed With The Korean Intellectual Property Office on Apr. 13, 2007 and assigned Serial No. 2007-36670, the contents of which are incorporated herein by reference.

TECHNICAL FIELD OF THE INVENTION

The present invention relates to a WCDMA mobile communication system, and more particularly to a method for transitioning the radio resource control state of a user equipment (UE) to an idle state, a system therefor, and the same UE.

BACKGROUND OF THE INVENTION

A WCDMA mobile communication system provides a Multimedia Broadcast/Multicast Service (MBMS) to user equipments (UEs). The MBMS is a service for transmitting data packets to users.

FIG. 1 is a block diagram illustrating the configuration of a WCDMA mobile communication system supporting such an MBMS.

The WCDMA mobile communication system includes at least one UE 10 and/or 12 for receiving the MBMS, a UMTS Terrestrial Radio Access Network (UTRAN) containing a node B 20 and a radio network controller (RNC) 30, a Serving GPRS Support Node (SGSN) 40 belonging to a core network (CN), a Home Location Register (HLR) 42, a Gateway GPRS Support Node (GGSN) (not shown), and a packet network 50 for transmitting packet data.

The UE 10 or 12 is connected to the node B 20 and the UTRAN so as to process a call, supports both circuit service (CS) and packet service (PS), and includes hardware and software for receiving MBMS data. The node B 20 is connected to the UE 10 or 12 via a Uu interface, and the RNC 30 is connected to the SGSN 40 via an Iu interface.

The UTRAN performs a protocol conversion process to transfer radio frequency (RF) data control messages, transmitted from the UE 10 or 12 over the air, to the CN using a GPRS Tunneling Protocol (GTP). In this case, the GPRS (General Packet Radio Service) is a packet data service provided in the UMTS network. The SGSN 40 is a network node for managing subscriber and position information of the UE 10 or 12. The SGSN 40 is connected to the UTRAN via an Iu interface, and transmits/receives data, control messages, etc. to/from the packet network 50. The SGSN 40 is connected to the HLR 42 via a Gr interface, and manages the subscriber information and position information. The HLR 42 stores subscriber information of a packet domain, routing information, etc. The HLR 42 is connected to the SGSN 40 via a Gr interface. A message flow for transmitting/receiving packet data in a WCDMA mobile communication system having the aforementioned construction will now be described with reference to FIG. 2.

First, in order for the UE 10 and the RNC 30 to transmit or receive packet data therebetween, a radio resource control (RRC) connection must be set between the UE 10 and the RNC 30.

The RRC connection set between the UE 10 and the RNC 30 may have one of three states (i.e., a CELL_DCH state, a CELL_FACH state, and an IDLE state) and transitions between the CELL_DCH state, the CELL_FACH state and the IDLE state according to the volume of packet data traffic transmitted and received between the UE 10 and the RNC 30.

The CELL_DCH state refers to a 3GPP WCDMA RRC state, and represents a state in which the RRC connection and a dedicated physical channel are connected between a UE and a node B (i.e. UTRAN) in a WCDMA network. In the CELL_DCH state, a large amount of packet data is actually transmitted or received.

The CELL_FACH state refers to a 3GPP WCDMA RRC state, and represents a state in which the dedicated physical channel is released and the RRC connection is maintained. In the CELL_FACH state, an S-CCPCH (FACH) is continuously monitored, and a small amount of uplink or downlink packet data can be transmitted or received.

The IDLE state represents a state in which both RRC connection and dedicated physical channel have been released. In the IDLE state, only a paging indication channel (PICH) is monitored, and it is possible to enter a WCDMA protocol sleep state.

Referring to FIG. 2, the UE 10 transmits an RRC connection setup request message to the RNC 30 in step 102. When receiving the RRC Connection Setup Request message, the RNC 30 transmits an RRC Connection Setup message to the UE 10 in step 104. When receiving the RRC Connection Setup message, the UE 10 transmits an RRC Connection Setup Complete message to the RNC 30 in response to the RRC Connection Setup message, thereby setting an RRC connection between the UE 10 and RNC 30.

Then, the UE 10 performs a packet data protocol (PDP) Context Activation procedure for packet data communication. In detail, the UE 10 transmits a PDP Context Activation Request message to the SGSN 40 in step 108. When receiving the PDP Context Activation Request message from the UE 10, the SGSN 40 transmits a PDP Context Activation Accept message to the UE 10 in step 110, thereby enabling the UE 10 to perform packet communication.

After the PDP Context Activation procedure, uplink and downlink packet data traffic is transmitted between the UE 10 and the SGSN 40 in step 112. Thereafter, when there is no packet data traffic transmitted between the UE 10 and the SGSN 40 in step 114, the RNC 30 changes a state of a physical channel established between the UE 10 and RNC 30 in step 116. In other words, when the volume of packet data traffic transmitted to or received from the UE 10 is reduced, the RNC 30 transitions to the CELL_FACH state. Subsequently, when the RNC 30 determines that there is no more packet data traffic transmitted in step 118, the RNC 30 proceeds to step 120, where the RNC 30 transmits an RRC Connection Release message to the UE 10. In response to the RRC Connection Release message, the UE 10 transmits an RRC Connection Release Complete message to the RNC 30 in step 122, so that the RRC connection transitions to the IDLE state.

As described above, according to the conventional WCDMA 3GPP standard, while packet data is being transmitted/received after signaling for transmission of packet data has been achieved between the UE 10 and the SGSN 40, if the volume of packet data traffic is reduced, the RNC 30 releases the RRC connection, and instructs the UE 10 to transition the RRC state from the CELL_FACH (or CELL_DCH) state to the IDLE state.

Through this, the UE 10 releases the RRC connection, and transitions from the CELL_FACH (or CELL_DCH) state to the IDLE state, thereby entering a sleep state in terms of protocol. When the UE 10 has entered the sleep state, power consumption is minimized, so that it is possible to stably manage the battery thereof.

However, some WCDMA networks have a problem in that they do not release the RRC connection or that they release the RRC connection too late, although there is no more packet data traffic being transmitted in the CELL_FACH state.

According to the conventional technology, there is no way for the UE 10 to transition from the CELL_FACH state to the IDLE state, except for following the control of the network. Therefore, the UE 10 must continuously monitor a dedicated control channel (DCCH), a radio access channel (RACH) and a forward access channel (FACH) while in the CELL_DCH state, and must continuously monitor the FACH and the RACH while in the CELL_FACH state, so that unnecessary current consumption is caused, thereby decreasing the battery lifetime.

Also, among smart phones recently highlighted in the 3G market, WinCE-based phones have a menu which is configured in such a manner as to release a cellular connection by a wireless manager, so that the WinCE-based phone does not release the PDP connection, even when the End key is pressed, unlike other general phones, thereby having a high probability of causing the aforementioned problem.

SUMMARY OF THE INVENTION

To address the above-discussed deficiencies of the prior art, it is a primary object to provide a method for transitioning the state of a user equipment (UE) to an idle state, a system therefor, and the same UE.

In accordance with an aspect of the present invention, there is provided a system for transitioning a radio resource control (RRC) state of a user equipment to an idle state, the system including: the user equipment for transmitting a Signaling Connection Release indication (SCRI) message when packet data traffic transmitted to/received from the user equipment has not been generated during a predetermined time; and a radio network controller (RNC) for transmitting an RRC Connection Release message to the user equipment when the RNC has received the SCRI message from the user equipment.

In accordance with another aspect of the present invention, there is provided a method for transitioning a radio resource control (RRC) state of a user equipment to an idle state by the user equipment, the method including the steps of: determining if packet data traffic transmitted from/received to the user equipment has not been generated during a predetermined time; and transmitting a Signaling Connection Release Indication (SCRI) message to a radio network controller (RNC) when the packet data traffic transmitted from/received to the user equipment has not been generated during a predetermined time.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

According to the present invention, there is provided a method for solving an inefficient current consumption problem which is caused because a WCDMA network attempts to transition a radio resource control (RRC) state to an IDLE state when there is no packet data actually being transmitted/received in a packet data transmission/reception stage, a system for the method, and an operation method of a user equipment (UE) therefor.

According to an exemplary embodiment of the present invention, in a WCDMA mobile communication system, when the amount of packet traffic transmitted to or received from a UE decreases during a predetermined time in a CELL_DCH state (which is an RRC state in which a dedicated physical channel has been connected), in which a WCDMA packet data connection has been established, the UE transitions to a CELL_FACH state by a radio network controller (RNC). Thereafter, it is determined if there is no transmitted or received packet traffic during a certain time in the CELL_FACH state (which is an RRC state in which an RRC connection has been connected, and the dedicated physical channel has been released). When it is determined that there is no transmitted/received packet traffic during the certain time, the UE requests a network to release the RRC connection by utilizing a Signaling Connection Release Indication (SCRI) message.

According to the conventional WCDMA 3GPP standard (3GPP TS 25.331), it is stipulated that the SCRI message should be transmitted by a UE either when the UE fails in an RRC connection in a network, or when a time-out of transmission/reception of a dedicated control channel (DCCH) message on an RRC connection occurs. In contrast, according to the present invention, a UE checks a packet transmission/reception flow, and can directly transmit the SCRI message to the network.

In addition, according to an exemplary embodiment of the present invention, when an Iu Release request is transmitted between a radio network controller (RNC) and an SGSN under the above situation, the RNC establishes "cause 40" in the Iu Release request, and transmits the Iu Release request to the SGSN. When the SGSN receives the Iu Release request with the "cause 40," the SGSN can terminate only the Iu signaling connection while maintaining the PDP connection.

Figure 1:
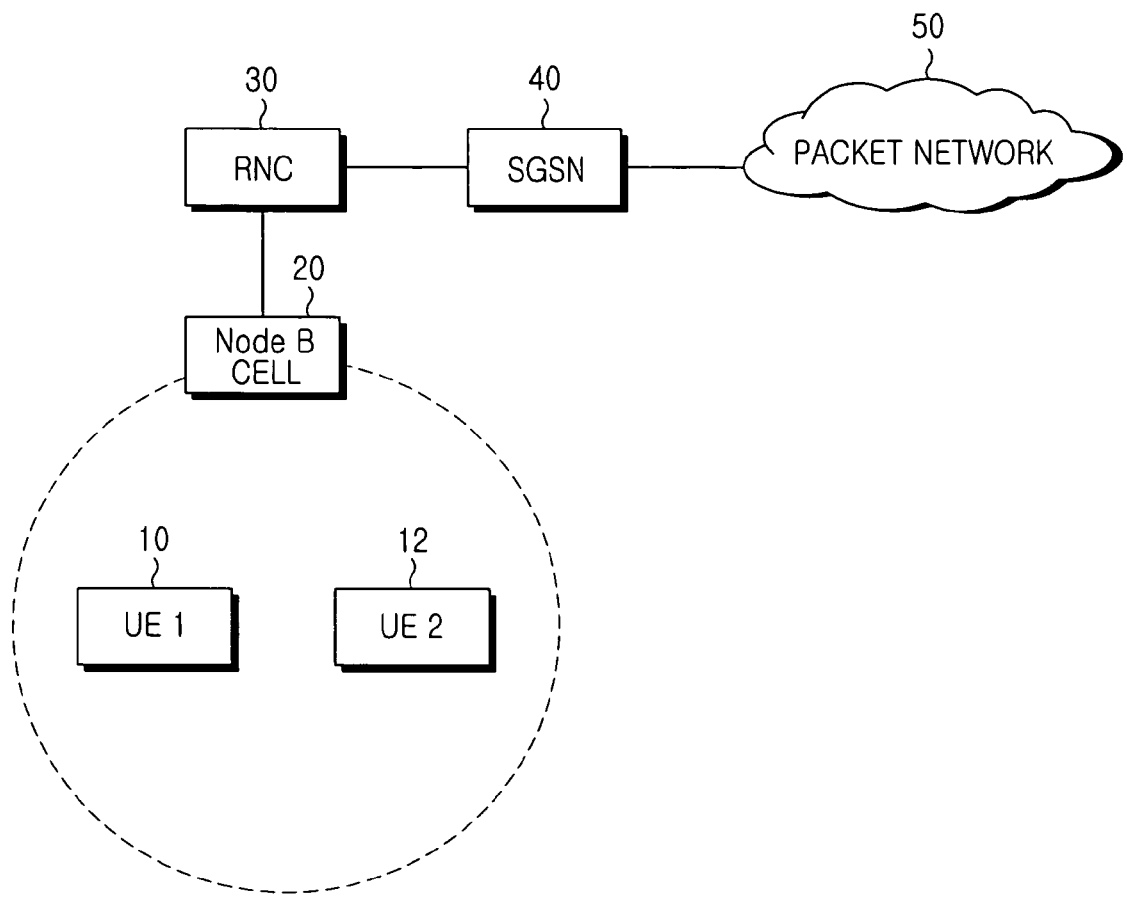
FIG. 1 is a block diagram illustrating the configuration of a conventional WCDMA mobile communication system.
Figure 2:
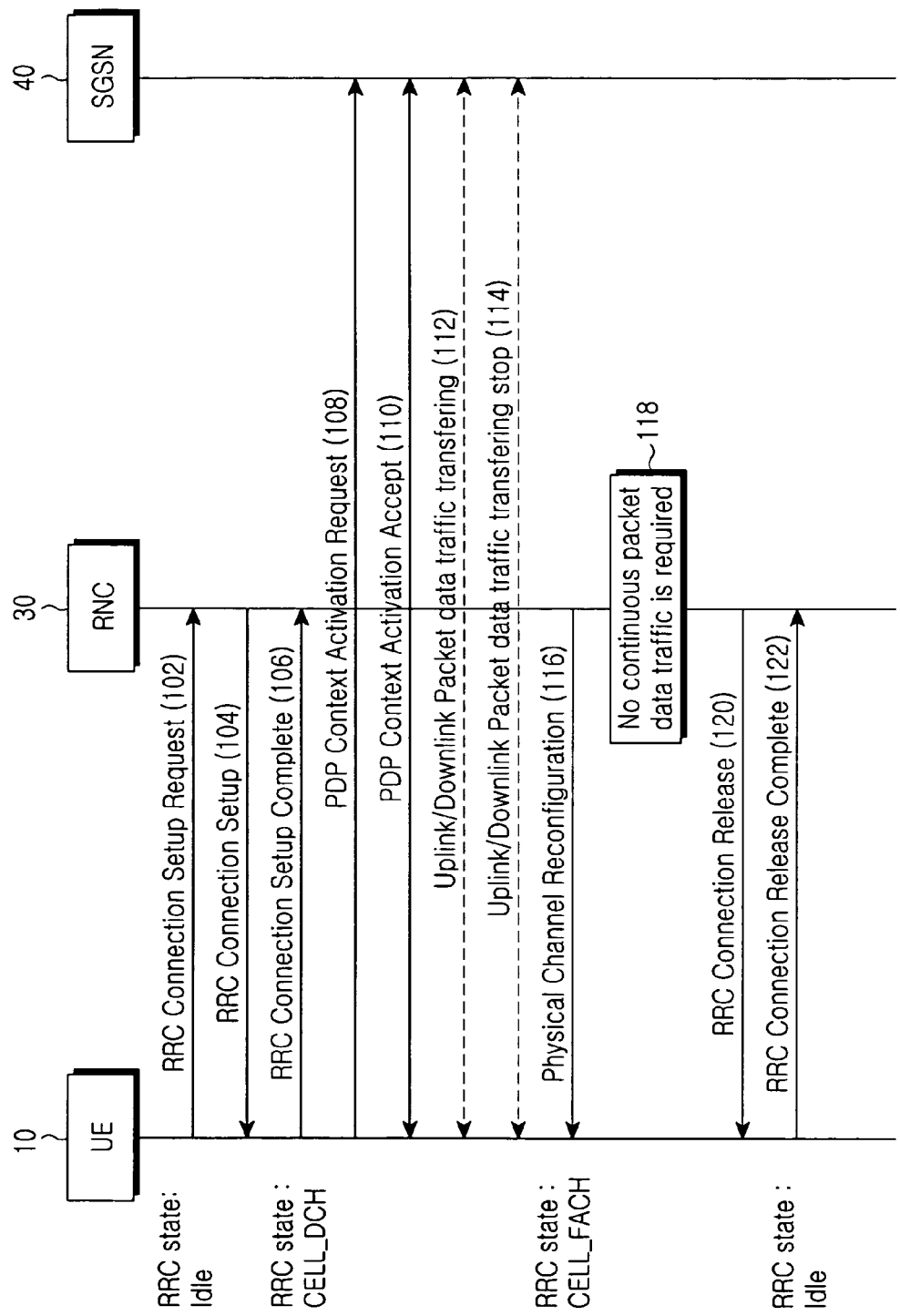
FIG. 2 is a flow diagram illustrating a message flow for packet data transmission/reception in the conventional WCDMA mobile communication system.
Figure 3:
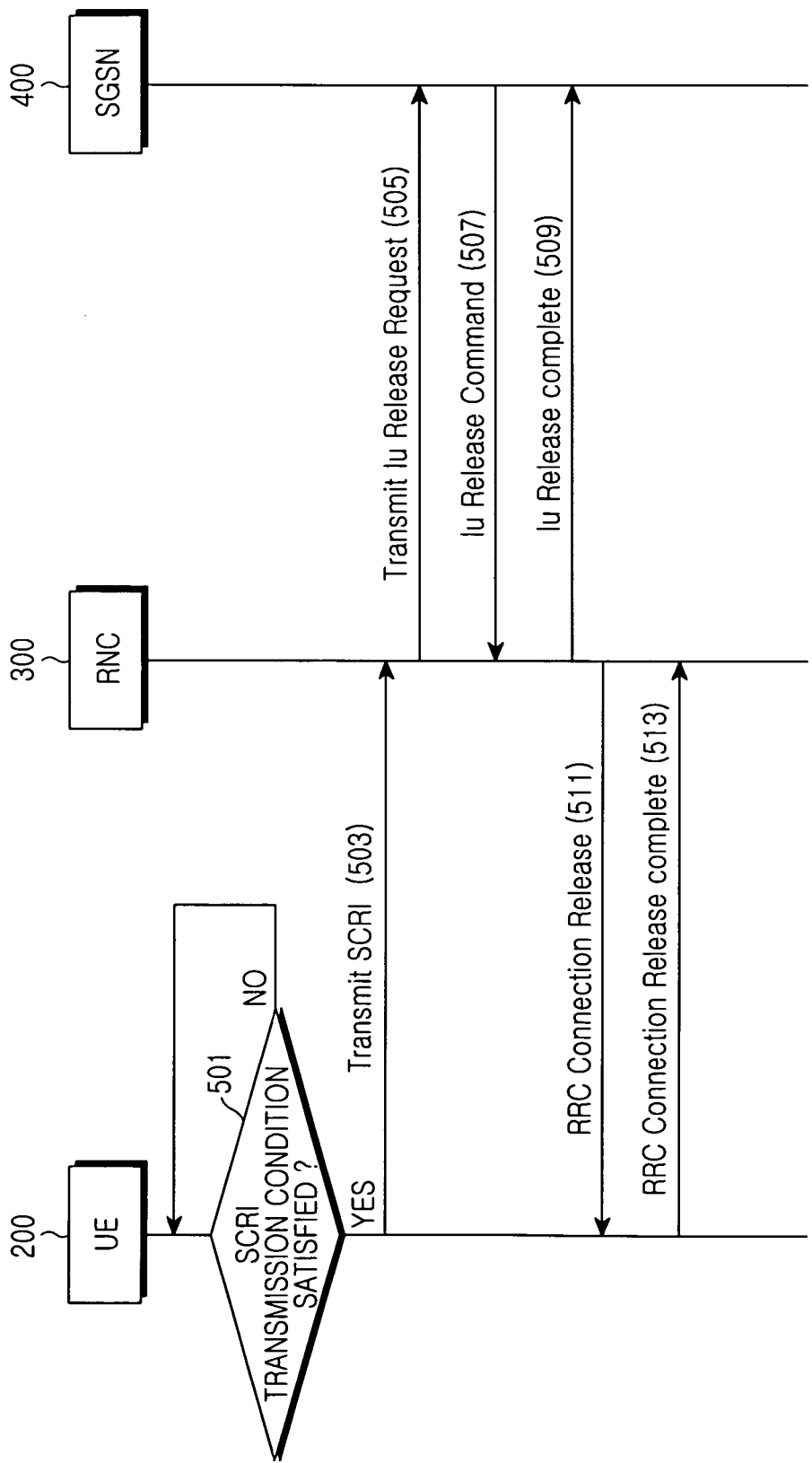
FIG. 3 is a flow diagram illustrating a method for transitioning to the IDLE state in a WCDMA mobile communication system according to an exemplary embodiment of the present invention.

FIG. 3 is a flow diagram illustrating a method for transitioning to the IDLE state in a WCDMA mobile communication system according to an exemplary embodiment of the present invention.

In step 501, a UE 200 determines if an SCRI transmission condition is satisfied. The SCRI transmission condition is a condition for transmitting an SCRI message from the UE 200 to an RNC 300. In detail, the UE 200 periodically reports the volume of packet data traffic transmitted from/received to the UE 200 to the RNC 300. Then, the RNC 300 instructs the UE 200 to transition to the CELL_FACH state based on the reported volume of packet data traffic. The UE 200 transitions to the CELL_FACH state, and then determines if the SCRI transmission condition is satisfied.

According to an exemplary embodiment of the present invention, when there is no packet data traffic transmitted from/received to the UE during a certain time or certain period, it is determined that the SCRI transmission condition is satisfied. In this case, the UE 200 transitions to the CELL_FACH state, and then determines if packet data traffic transmitted from/received to the UE 200 has not been generated during a certain time. According to another exemplary embodiment of the present invention, the UE 200 may determine if packet data traffic transmitted from/received to the UE 200 has not been generated during a certain time in the CELL_DCH state. It will be understood by those skilled in the art that various SCRI transmission conditions may be established depending on operators or systems.

When the SCRI transmission condition has been satisfied, the UE 200 transmits an SCRI message to the RNC 300 in step 503. In this case, if only a packet switching domain service is currently in activation, the UE 200 only has to record "ps" as a factor of the SCRI and to transmit an SCRI message, and if the UE 200 is in a multi-RAB (Radio Access Bearer) situation (e.g. CS+PS: a case where a Circuit Switching Domain Dedicated Resource and a Packet Switching Domain Dedicated Resource are simultaneously allocated to and used by the UE 200), the UE 200 transmits an SCRI message to the RNC 300 after the CS domain service (e.g. voice call) has been completed.

When receiving the SCRI message, the RNC 300 transmits an Iu Release Request message to an SGSN 400 in step 505. In this case, a cause value included in the Iu Release Request message is set to "cause 40 (Release due to UE generated signaling connection release)."

Since the cause value included in the received Iu Release Request message has been set to "cause 40," the SGSN 400 can determine that the RNC 300 requests the SGSN 400 to release an Iu signaling connection, but to maintain a PDP connection. Accordingly, the SGSN 400 transmits an Iu Release Command message to the RNC 300 in step 507 in order to preserve the PDP connection and to release the Iu signaling connection.

When receiving the Iu Release Command message, the RNC 300 releases an Iu signaling connection resource, and transmits an Iu Release Complete message to the SGSN 400 in step 509. Thereafter, the RNC 300 transmits an RRC Connection Release message to the UE 200 in step 511 in order to release an RRC connection with the UE 200.

After receiving the RRC Connection Release message, the UE 200 changes the RRC state to the IDLE state while transmitting an RRC Connection Release Complete message to the RNC 300 in step 513, which can achieve a state transition to a sleep state in terms of protocol, thereby largely reducing the amount of current consumption.

Figure 4:
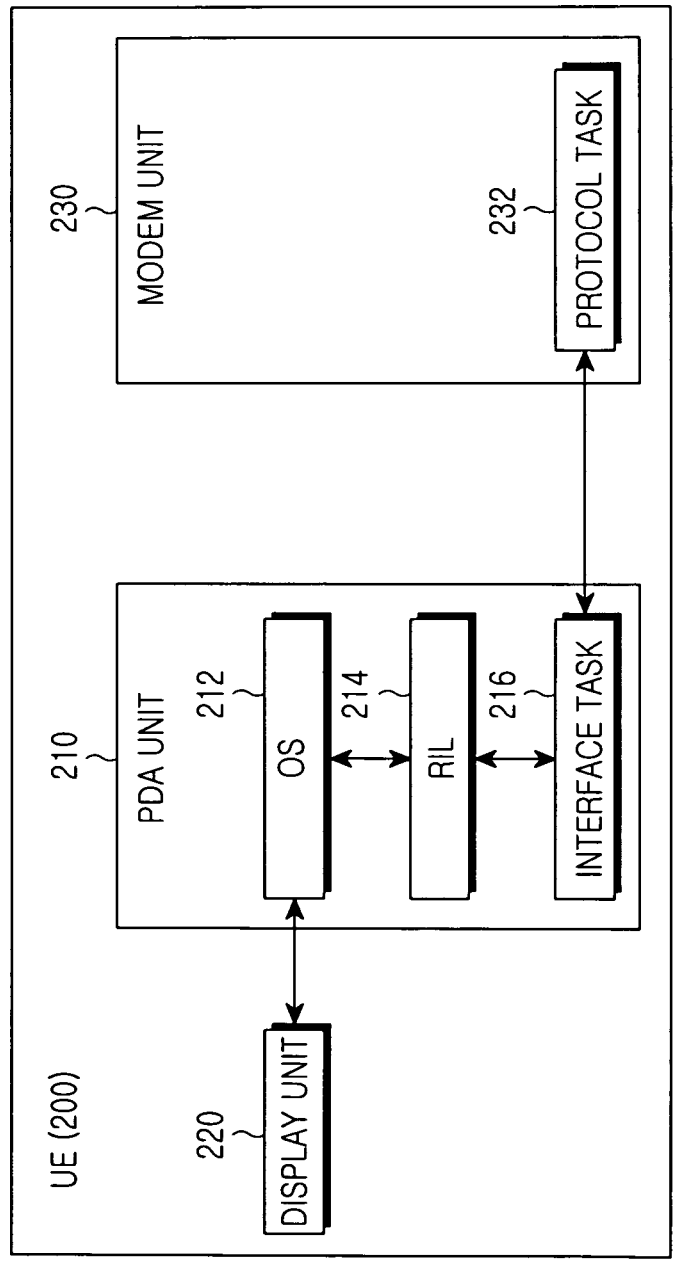
FIG. 4 is a block diagram illustrating the configuration of a user equipment (UE) according to an exemplary embodiment of the present invention.

FIG. 4 is a block diagram illustrating the configuration of the UE according to an exemplary embodiment of the present invention. Preferably, the UE 200 may be a smart phone according to an exemplary embodiment of the present invention.

The UE 200 includes a PDA unit 210, a display unit 220, and a modem unit 230. The modem unit 230 includes a protocol task section 232. The protocol task section 232 communicates with a WCDMA network, transfers packet data from the network to the PDA unit 210, and transmits various data from the PDA unit 210 to the network. In addition, the protocol task section 232 monitors the volume of packet data traffic transmitted/received between the UE 200 and the network.

The PDA unit 210 includes an operating system (OS) 212, a radio interface layer (RIL) 214, and an interface task section 216. The interface task section 216 performs interfacing with the modem unit 230. The interface task section 216 monitors the volume of packet data traffic transmitted/received between the interface task section 216 and the modem unit 230. In addition, the interface task section 216 receives, from the protocol task section 232, information about the volume of packet data traffic transmitted/received between the UE 200 and the network. The interface task section 216 determines if the SCRI transmission condition is satisfied, based on the volume of packet data traffic transmitted/received between the interface task section 216 and the modem unit 230, and the volume of packet data traffic transmitted/received between the UE 200 and the network.

As described above, the SCRI transmission condition is satisfied when packet data traffic transmitted from/received to the UE has not been generated during a certain time. To this end, the interface task section 216 may include a certain timer (not shown), or may use an existing timer within the PDA unit 210.

When the SCRI transmission condition is satisfied, the interface task section 216 notifies the RIL 214 that it is necessary to enter a PDP Preservation state. The PDP Preservation state represents a state in which a PDP connection is preserved while an Iu signaling connection has been released.

The RIL 214 interfaces, for example, an operating system for a wireless UE, such as a CellCore layer of a Windows Mobile, with a wireless protocol stack within the modem chip 230. In addition, when the RIL 214 receives the report that it is necessary to enter the PDP Preservation state from the interface task section 216, the RIL 214 transfers the notification for the PDP Preservation to the operating system 212.

Upon receiving the notification for the PDP Preservation from the RIL 214, the operating system 212 calls an RIL application programming interface (RIL API). Then, the RIL 214 instructs the interface task section 216 to transmit an SCRI message to the network according to the called RIL API. The interface task section 216 instructs the RRC to transmit an SCRI to the RNC 300, in response to the instruction of the RIL 214.

A control flow for transitioning to the IDLE state by the UE will now be described with reference to FIG. 5.

Figure 5:
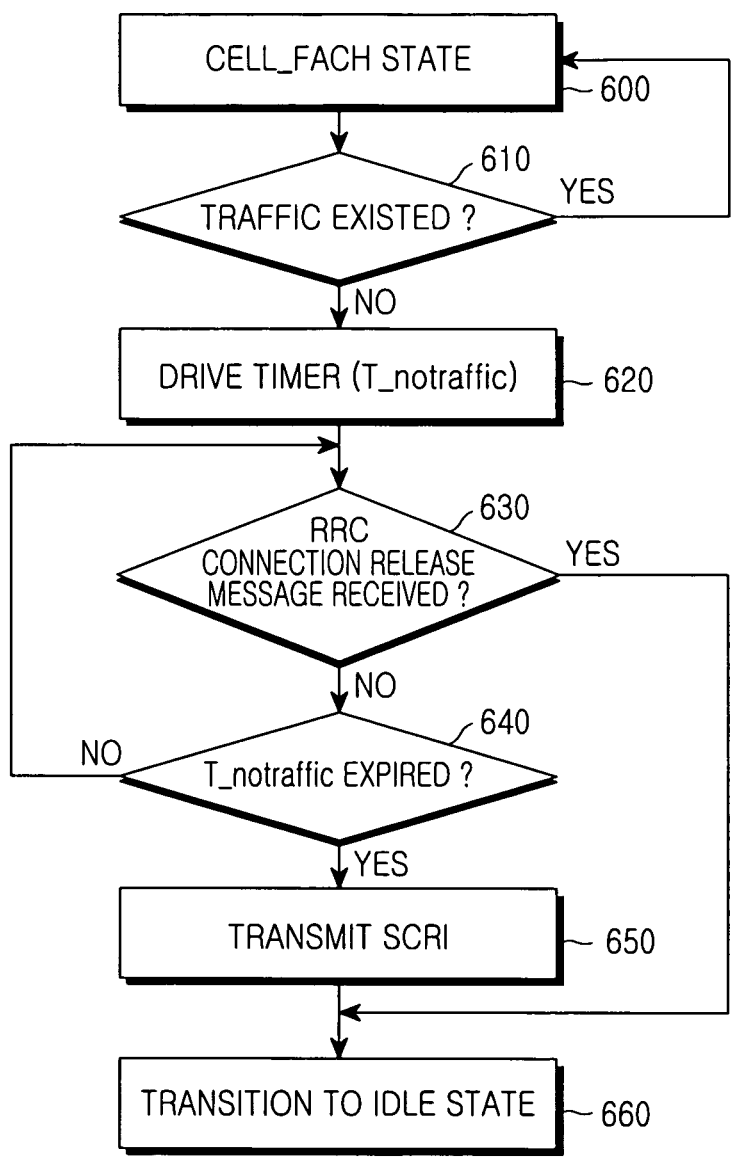
FIG. 5 is a flowchart illustrating a method for transitioning to the IDLE state by the UE according to an exemplary embodiment of the present invention.

FIG. 5 is a flowchart illustrating a method for transitioning to the IDLE state by the UE according to an exemplary embodiment of the present invention.

First, the UE 200 periodically measures and reports the volume of packet data traffic to the RNC 300. The network, i.e. the RNC 300, changes the RRC state of the UE 200 based on the volume of packet data traffic reported from the UE 200. The following description will be given on the assumption that the UE 200 periodically measures the volume of packet data traffic.

Referring to FIG. 5, in step 600, the UE 200 is in the CELL_FACH state. As described above, the CELL_FACH state represents a state in which a dedicated physical channel has been released while the RRC connection is maintained. In the CELL_FACH state, the UE 200 can transmit or receive a small amount of uplink or downlink packet data to or from the network.

When the UE 200 has entered the CELL_FACH state, the UE 200 determines if there is packet data traffic transmitted to/received from the RNC 300 in step 610. If it is determined that there is no transmitted/received packet data traffic, the UE 200 proceeds to step 620, where the UE 200 drives a timer "T_notraffic." The operating time of the timer is appropriately determined so as to prevent the UE 200 from being maintained in the CELL_FACH state and consuming battery power during no transmitted/received packet data traffic.

In detail, the operating time of the timer, i.e. a timer value, is determined to be an appropriate value for at least driving the timer directly after packet traffic is measured as zero by a traffic volume management of a MAC entity, and preventing battery power from being consumed. Generally, it takes about 10 seconds to release an RRC connection in an actual WCDMA commercial network. Therefore, the operating time of the timer may be determined by taking the time into consideration. Otherwise, the user may directly set the timer value through a menu.

After the timer has been driven, the UE 200 proceeds to step 630, where the UE 200 determines if the UE 200 has received an RRC Connection Release message from the RNC 300. The network, i.e. the RNC 300, may transmit the RRC Connection Release message before the timer expires. When receiving the RRC Connection Release message, the UE 200 proceeds to step 660.

In contrast, when the UE 200 has not received the RRC Connection Release message from the RNC 300, the UE 200 proceeds to step 640, where the UE 200 determines if the timer "T_notraffic" expires. When the timer "T_notraffic" does not expire, the UE 200 returns to step 630.

In contrast, when the timer "T_notraffic" expires, the UE 200 transmits an SCRI message to the RNC 300 in step 650, and transitions to the IDLE state in step 660.

Figure 6:
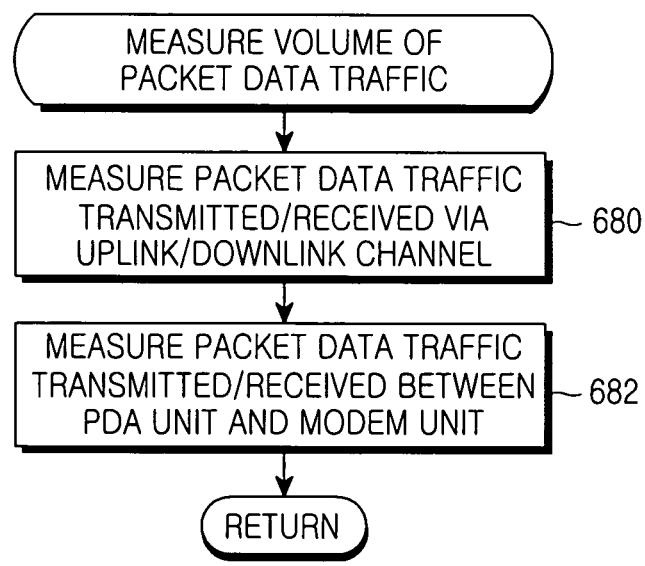
FIG. 6 is a flowchart illustrating a method for measuring the volume of packet data traffic according to an exemplary embodiment of the present invention.

FIG. 6 is a flowchart illustrating a method for measuring the volume of packet data traffic by the UE according to an exemplary embodiment of the present invention. In step 680, the UE 200 measures packet data traffic transmitted/received through an uplink channel and a downlink channel. That is, the UE 200 monitors the volume of packet data traffic transmitted/received between the UE 200 and the network. Next, the UE 200 measures packet data traffic transmitted/received between the PDA unit 210 and the modem unit 230.

Although there is no packet data being transmitted or received between the UE 200 and the network, there may exist packet data transmitted/received between the PDA unit 210 and the modem unit 230. According to an exemplary embodiment of the present invention, when there is no packet data being transmitted or received not only between the UE 200 and the network, but also between the PDA unit 210 and the modem unit 230, the SCRI message can be transmitted. Another exemplary embodiment of the present invention may be implemented in such a manner that when there is no packet data being transmitted or received between the UE 200 and the network, the UE 200 transmits the SCRI message, even if there is packet data being transmitted/received between the PDA unit 210 and the modem unit 230.

Figure 7:
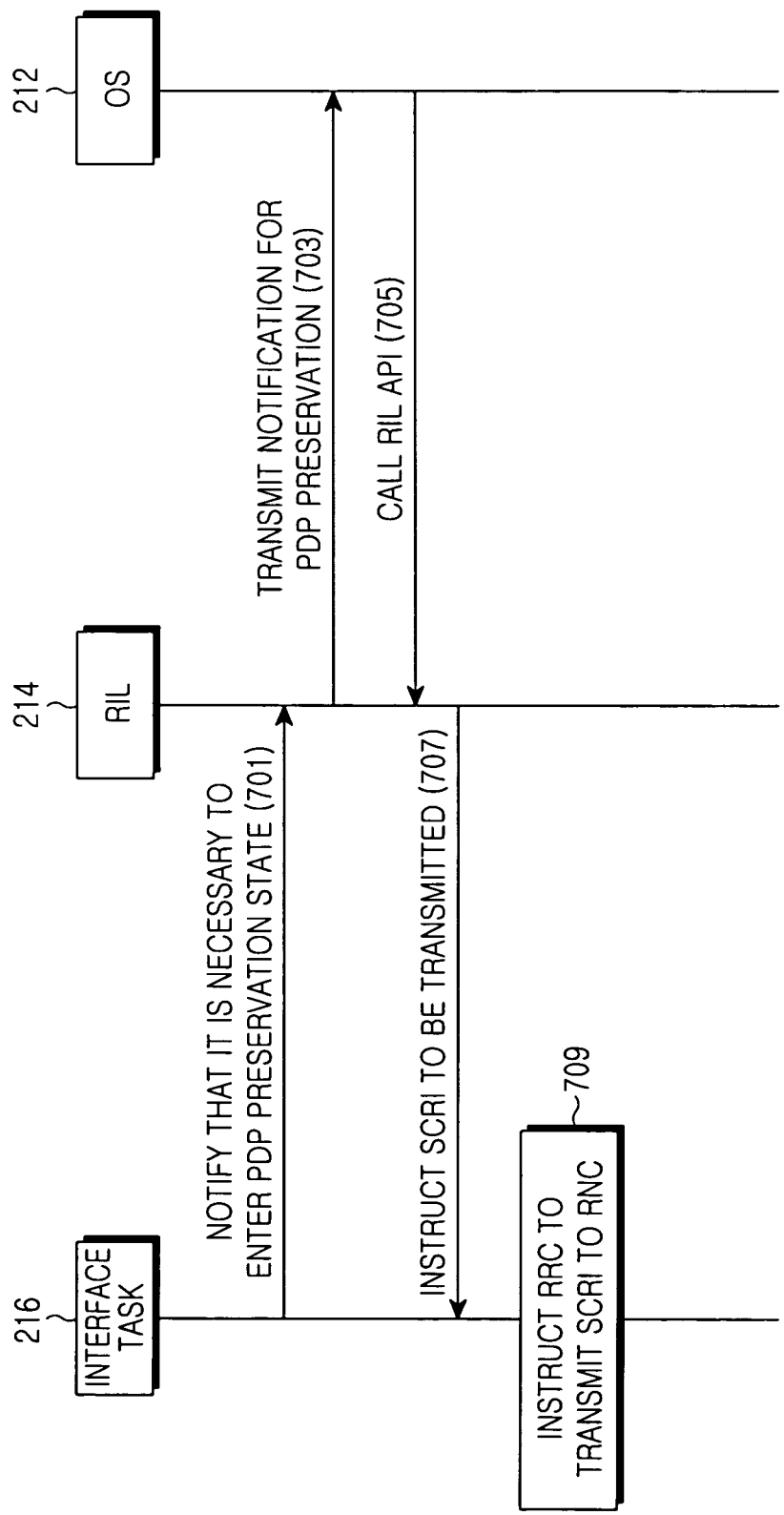
FIG. 7 is a flow diagram illustrating a mechanism for internally generating an SCRI transmission instruction by the UE according to an exemplary embodiment of the present invention.

FIG. 7 is a flow diagram illustrating a mechanism for internally generating an SCRI transmission instruction by the UE according to an exemplary embodiment of the present invention.

When an event satisfying an SCRI transmission condition occurs, the interface task section 216 notifies the RIL 214 that it is necessary to enter a PDP Preservation state in step 701. The PDP Preservation state represents a state in which a PDP connection is preserved while an Iu signaling connection has been released. When receiving the notification that it is necessary to enter the PDP Preservation state from the interface task section 216, the RIL 214 transfers a notification for the PDP Preservation to the operating system 212 in step 703.

When receiving the notification for the PDP Preservation from the RIL 214, the operating system 212 calls an RIL Application Programming Interface (RIL API) in step 705. Then, in step 707, the RIL 214 instructs the interface task section 216 to transmit an SCRI message to the network according to the called RIL API. In step 709, the interface task section 216 instructs the RRC to transmit the SCRI to the RNC 300, in response to the instruction of the RIL 214.

Meanwhile, although the embodiment of the present invention has been described about a case where the UE transitions from the CELL_FACH state to the IDLE state, the present invention may be applied to a case where the UE transitions from the CELL_DCH state to the IDLE state. In other words, even when the current RRC state of the UE is the CELL_DCH state, the method of the present invention may be performed if there is no packet data traffic being transmitted or received between the UE and the network.

As described above, the method according to the present invention can solve a problem of unnecessarily increasing current consumption of the UE, which is caused because the network does not attempt to release the RRC connection or attempts to release the RRC connection too late, although there is no more packet data traffic actually being transmitted in the CELL_FACH state.

In detail, the method according to the present invention can be applied to all WinCE-based 3G UEs using WCDMA data service, and can efficiently handle a current consumption increase due to problems resulting from the network. In addition, the method according to the present invention can be internally implemented by applying an additional algorithm to the UE, without a change in the existing 3GPP messages, and may be applied even to the network of an actual provider through interoperability testing (IOT) in the RNC/SGSN.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for transitioning a radio resource control (RRC) state of a user equipment to an idle state, the system comprising:
the user equipment configured to measure a volume of packet data traffic transmitted by or received by the user equipment when the RRC state of the user equipment is changed to a CELL_FACH state, and transmit a Signaling Connection Release indication (SCRI) message when the packet data traffic has not been generated during a predetermined time; and
a radio network controller configured to transmit an RRC Connection Release message to the user equipment when the radio network controller has received the SCRI message from the user equipment,
wherein:
the SCRI message is configured to release a Signaling Connection while maintaining a Packet Data Protocol (PDP) connection, and
the user equipment is configured to transition the RRC state of the user equipment to the idle state when the RRC Connection Release message is received from the radio network controller.

2. The system as claimed in claim 1, further comprising a Serving General Packet Radio Service (GPRS) support node connected to the radio network controller via an Iu interface,
wherein the radio network controller is configured to transmit an Iu Release Request message to the GPRS support node upon receiving the SCRI message, and is configured to transmit the RRC Connection Release message upon receiving an Iu Release Complete message.

3. The system as claimed in claim 1, wherein the user equipment is further configured to:
monitor the volume of packet data traffic transmitted or received between the user equipment and a network.

4. The system as claimed in claim 1, wherein the user equipment is further configured to notify a radio interface layer (RIL) to enter a PDP preservation state when packet data traffic transmitted by or received by the user equipment has not been generated during the predetermined time; and
the RIL is configured to:
transmit the notification for PDP preservation to an operating system, and
instruct an interface task section to transmit the SCRI message to the radio network controller.

5. The system as claimed in claim 4, wherein:
the operation system is configured to call an RIL application programming interface (RIL API), and
the RIL is configured to instruct the interface task according to the RIL API.

6. The system as claimed in claim 1, wherein the system is a wideband code-division multiple-access (WCDMA) mobile communication system.

7. The system as claimed in claim 1, wherein the user equipment is configured to measure the volume of packet data traffic transmitted by or received by the user equipment when the RRC state of the user equipment is changed to a CELL_DCH state.

8. The system as claimed in claim 1, wherein a length of the predetermined time is based on battery power consumption of the UE.

9. A method for transitioning a radio resource control (RRC) state of a user equipment to an idle state by the user equipment, the method comprising:
measuring a volume of packet data traffic transmitted by or received by the user equipment when the RRC state of the user equipment is changed to a CELL_FACH state;
determining whether the packet data traffic has not been generated during a predetermined time;
transmitting a Signaling Connection Release Indication (SCRI) message to a radio network controller when the packet data traffic transmitted by or received by the user equipment has not been generated during a predetermined time; and
transitioning the RRC state of the user equipment to the idle state when an RRC Connection Release message is received from the radio network controller,
wherein the SCRI message is configured to release a Signaling Connection, while maintaining a Packet Data Protocol (PDP) connection.

10. The method as claimed in claim 9, wherein transmitting comprises:
notifying a radio interface layer (RIL) that it is necessary to enter a PDP preservation state when the packet data traffic transmitted by or received by the user equipment has not been generated during the predetermined time;
transmitting a notification for PDP preservation from the RIL to an operating system;
calling an RIL application programming interface (RIL API) by the operating system; and
instructing the RIL to transmit the SCRI message to the radio network controller.

11. The method as claimed in claim 9 further comprising:
measuring the volume of packet data traffic transmitted by or received by the user equipment when the RRC state of the user equipment is changed to a CELL_DCH state.

12. The method as claimed in claim 9, wherein instructing the RIL to transmit the SCRI message comprises instructing the instructing the RIL to transmit the SCRI message according to the RIL API.

13. The method as claimed in claim 9, wherein a length of the predetermined time is based on battery power consumption by the UE.

14. A user equipment for transitioning a radio resource control (RRC) state to an idle state, the user equipment comprising:
a modem unit configured to measure a volume of packet data traffic transmitted by or received by the user equipment when the RRC state of the user equipment is changed to a CELL_FACH state, and to determine whether the packet data traffic has not been generated during a predetermined time; and
a Personal Digital Assistant (PDA) unit configured to:
instruct the modem unit to transmit a Signaling Connection Release Indication (SCRI) message to a radio network controller when the packet data traffic has not been generated during a predetermined time, and
transition the RRC state of the user equipment to the idle state when an RRC Connection Release message is received by the modem unit from the radio network controller, wherein the SCRI message is configured to release a Signaling Connection while maintaining a Packet Data Protocol (PDP) connection.

15. The user equipment as claimed in claim 14, wherein the modem unit comprises a protocol task section configured to:
monitor the volume of packet data traffic transmitted or received between the user equipment and a network, and
provide information about the volume of packet data traffic to the PDA unit.

16. The user equipment as claimed in claim 15, wherein: the PDA unit comprises an interface task configured to:
receive from the protocol task section information about the monitored volume of packet data traffic, and
notify a radio interface layer (RIL) to enter a PDP preservation state when packet data traffic transmitted by or received by the user equipment has not been generated during the predetermined time; and
the RIL is configured to:
transmit the notification for PDP preservation to an operating system, and
instruct the interface task section to transmit the SCRI message to the radio network controller.

17. The user equipment as claimed in claim 16, wherein:
the PDA unit further comprises an operation system configured to call an RIL application programming interface (RIL API), and
the RIL is configured to instruct the interface task according to the RIL API.

18. The user equipment as claimed in claim 14, wherein the modem unit is configured to measure the volume of packet data traffic transmitted by or received by the user equipment when the RRC state of the user equipment is changed to a CELL_DCH state.

* * * * *